(12) United States Patent
Lincke

(10) Patent No.: US 9,948,997 B2
(45) Date of Patent: Apr. 17, 2018

(54) PROVIDING INTERACTIVITY OPTIONS FOR TELEVISION BROADCAST CONTENT

(71) Applicant: Excalibur IP, LLC, New York, NY (US)

(72) Inventor: Scott Lincke, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 68 days.

(21) Appl. No.: 14/631,773

(22) Filed: Feb. 25, 2015

(65) Prior Publication Data

US 2016/0249115 A1 Aug. 25, 2016

(51) Int. Cl.

| | |
|---|---|
| *H04N 21/8545* | (2011.01) |
| *H04N 21/233* | (2011.01) |
| *H04N 21/266* | (2011.01) |
| *H04N 21/258* | (2011.01) |
| *H04N 21/431* | (2011.01) |
| *H04N 21/4788* | (2011.01) |

(Continued)

(52) U.S. Cl.
CPC ....... *H04N 21/8545* (2013.01); *H04N 21/233* (2013.01); *H04N 21/25891* (2013.01); *H04N 21/266* (2013.01); *H04N 21/2668* (2013.01); *H04N 21/4316* (2013.01); *H04N 21/4788* (2013.01); *H04N 21/6581* (2013.01)

(58) Field of Classification Search
CPC .. H04N 21/233; H04N 21/4394; H04N 7/083; H04N 7/084; H04N 7/087; H04N 21/436; H04N 21/64707; H04N 2005/44547; H04N 2005/44556; H04N 21/482; H04N 21/4821; H04N 5/44543; H04N 5/60; H04N 21/812; H04H 60/58; H04H 20/31
See application file for complete search history.

(56) References Cited

U.S. PATENT DOCUMENTS

| | | | |
|---|---|---|---|
| 7,293,275 B1 * | 11/2007 | Krieger | H04N 5/44543 348/E5.105 |
| 2008/0082927 A1 * | 4/2008 | Kelts | G06F 3/0481 715/762 |

(Continued)

*Primary Examiner* — Oleg Asanbayev
*Assistant Examiner* — Anthony Bantamoi
(74) *Attorney, Agent, or Firm* — Martine Penilla Group, LLP

(57) ABSTRACT

Methods and system for providing interactive media for broadcast content includes receiving navigation input to a first channel that presents content of the television broadcast. Identity of the content is determined by generating an audio fingerprint using an audio signal of the content. Types of interactive media available during the presentation of the content from the first channel and a predetermined input for accessing the graphical notification are identified and used to generate a graphical notification. Access to interactive media presented within the graphical notification is enabled during rendering of the graphical notification and at any time during rendering of the content from the first channel, upon providing the predefined input. When the predefined input is detected, the types of interactive media available for the content are rendered, and content for the select one of the interactive media is presented, during presentation of the content from the first channel.

25 Claims, 7 Drawing Sheets

(51) Int. Cl.
*H04N 21/2668* (2011.01)
*H04N 21/658* (2011.01)

(56) References Cited

U.S. PATENT DOCUMENTS

2013/0139209 A1* 5/2013 Urrabazo ........... H04N 21/4828
 725/109
2013/0160038 A1* 6/2013 Slaney ................ H04N 21/233
 725/14

* cited by examiner

PROVIDING INTERACTIVITY OPTIONS FOR TELEVISION BROADCAST CONTENT

RELATED APPLICATIONS

This application is related to U.S. application Ser. No. 13/951,339, filed on Jul. 25, 2013, entitled "MULTI-FINGER USER IDENTIFICATION". This application is also related to U.S. application Ser. No. 13/332,331, filed on Dec. 20, 2011, and entitled "AUDIO FINGERPRINT FOR CONTENT IDENTIFICATION" (since patented as U.S. Pat. No. 8,949,872 with issue date of Feb. 3, 2015). Both of these applications are incorporated herein by reference in its entirety for all purposes.

FIELD OF THE INVENTION

The present invention relates to broadcast content interactivity, and more particularly, to presenting interactive options for broadcast content that can be accessed anytime during presentation of the broadcast content.

BACKGROUND

Description of the Related Art

Television viewing has changed over the years. The advancement in technology have allowed television manufacturers to integrate the Internet and web features into television sets providing the ability to connect to and access online interactive media, Internet TV, over-the-top content and on-demand streaming media through these television sets. In addition to the television sets, some of the external devices, such as set-top boxes, Blu-ray players, game consoles and other companion devices, also come equipped with these Internet and web features so as to enable conventional television sets without such integrated features to access the Internet and web features through these external devices. With these Internet-equipped television sets, viewers are able to search and find videos, movies, photos and other content available on the web, available locally or provided directly by content providers, such as cable content providers, satellite content providers, other users, etc. The Internet features incorporated in the TVs and external devices also offer integration with social network sites so as to allow the viewers to interact socially while allowing traditional TV viewing.

It is in this context that the embodiments of the invention arise.

SUMMARY

Embodiments of the present invention describe methods and systems that allow identifying content of a first channel selected for television broadcast. A graphical notification module is provided identifying types of interactive media available during rendering of the content, and a predefined input that is required for accessing the graphical notification. The interactive media available for the broadcast content can be accessed during the rendering of the graphical notification and at any time during the rendering of the content from the first channel by providing the predefined input defined in the graphical notification. User selection of a type of interactive media causes the rendering of the content for the selected interactive media. The selected interactive media content is contextually related to the broadcast content that is currently being rendered and provides additional information for the rendered broadcast content. The types of interactive media available for the broadcast content changes over time as the content of the first channel changes based on the progression of the television broadcast, so as to provide additional content that is not only contextually relevant but also corresponds to the current content of the television broadcast.

The types of interactive media available for the broadcast content are determined by first identifying the broadcast content. The broadcast content may be identified using a fingerprint technology that generates a fingerprint, such as an audio fingerprint, for a portion of the content using an audio signal of the content. Using the content identification information, the different types of interactive media that are available for the content are determined and used in the generation of the graphical notification. The graphical notification is provided after verifying the time of user engagement with the broadcast content meets a pre-defined threshold period of time. When a specific type of interactive media is selected, data content for the selected type of interactive media is presented during the rendering of the broadcast content.

Any switch in the broadcast content would result in the generation of a new set of fingerprints for identifying the switched content and the graphical notification is updated to include the types of interactive media that are available for the switched content. The graphical notification is provided after verifying the time of user engagement with the switched content meets a pre-defined threshold period of time. This ensures that the interactive media is not provided prematurely when a user is channel surfing.

In some embodiments, periodic verification of the streaming broadcast content is performed by generating new fingerprints periodically for different portions of the broadcast content and verifying the new fingerprints against corresponding pre-computed fingerprints. In such embodiments, the pre-computed fingerprints are retrieved for a plurality of broadcast content from various broadcast content sources, stored in a local memory (for e.g., local cache) and retrieved for periodic verification. The pre-computed fingerprints are refreshed periodically from various content sources to allow proper verification of the broadcast content. Thus, when a switch in the broadcast content is detected, the content processing module is able to determine the identity of the switched content using the pre-computed fingerprints.

In some other embodiments, channel identification may be provided whenever a user selects a particular broadcast channel for viewing. In these embodiments, generating fingerprints and verifying the generated fingerprints with pre-computed fingerprints may not be necessary. Thus, when the user changes the channel, the system may be able to detect the channel switching using the channel identification and determine the content of the switched and/or selected channel. Based on the content and the context of the content, graphical notification identifying the types of interactive media that are available for the switched content may be provided.

It should be appreciated that the present invention can be implemented in numerous ways, such as, methods and systems. Several inventive embodiments of the present invention are described below.

In one embodiment, a method for presenting interactive media for a television broadcast is disclosed. The method includes receiving an audio fingerprint generated for a portion of content of a first channel selected for television broadcast. The audio fingerprint is generated using an audio signal of the content. Identity of the content being presented on the first channel is determined using the generated audio fingerprint. Types of interactive media available for presenting during rendering of the content from the first channel and a predefined input for accessing the types of interactive media are identified. The identified types of interactive media are used to generate a graphical notification for presenting during rendering of the content of the first channel. Data to enable access to the types of interactive media via the graphical notification at any time during the rendering of the content from the first channel is provided, when the predefined input is selected, such that selection of one of the types of interactive media causes presentation of content for the selected one of the types of interactive media during rendering of the content of the first channel. The content for the selected ones of the types of interactive media has a contextual relationship to the content of the first channel. The types and content of interactive media available for the content changes over time as the content of the first channel changes based on progression of the television broadcast.

In another embodiment, a method for presenting interactivity options for a television broadcast is disclosed. The method includes receiving navigation input to a first channel that presents content of the television broadcast. The navigation input is received by a content processing module executing on a processor of a client computing device. An audio fingerprint for a portion of content of the first channel is generated by a content identification module using an audio signal of the content. The generated audio fingerprint is used to determine identity of the content presented on the first channel. Types of interactive media available for the content of the first channel are received by an interactive media processing module. A graphical notification for presenting during presentation of the content from the first channel is generated using a graphical notification module. The graphical notification includes the types of interactive media received for the content and a predefined input for accessing the types of interactive media. The generated graphical notification is presented on a display screen of the client computing device for a limited duration while rendering the content from the first channel. Access to the types of interactive media is enabled by the interactive media processing module during the rendering of the graphical notification and at any time during the rendering of the content from the first channel, upon detection of the predefined input. Content for a select one of the types of interactive media is presented by the interactive media processing module during presentation of the content from the first channel. The content for the select one of the types of interactive media have a contextual relationship to the content of the first channel. The types and content of interactive media available for the content changes over time as the content of the first channel changes based on progression of the television broadcast.

In another embodiment, a system for presenting interactivity options for a television broadcast is disclosed. The system includes a content processing module executing on a processor of a client computing device. The content processing module is configured to detect navigation input at the client computing device selecting a first channel that presents content of the television broadcast and provides the interactivity options for the content of the first channel. The content processing module includes content identification logic, an interactive media processing module, and a graphical notification module. The content identification module is configured to generate a fingerprint for a portion of the content of the first channel using an audio signal of the content. The generated fingerprint is used to determine identity of the content of the first channel selected for television broadcast. The interactive media processing module is configured to receive types of interactive media available for the content of the first channel. The graphical notification module is configured to generate a graphical notification identifying the types of interactive media available for the content and a predefined input for accessing the graphical notification. The graphical notification is presented on a display screen of the client computing device for a limited duration during the presentation of the content of the first channel. The interactive media processing module is further configured to provide access to the types of interactive media during the rendering of the graphical notification and at any time during the rendering of the content of the first channel, in response to the detection of the predefined input. The interactive media processing module to retrieve content for select ones of the types of interactive media for presenting on the display screen during the presentation of the content from the first channel. The content retrieved for the select ones of the types of interactive media have a contextual relationship to the content of the first channel. The types and content of interactive media available for the content changes over time as the content of the first channel changes based on progression of the television broadcast.

In yet another embodiment, a system for presenting interactivity options for a television broadcast is disclosed. The system includes a content processing module executing on a processor of a server computing device that is configured to identify content selected for television broadcast and to provide the interactivity options for the content of the first channel. The content processing module includes a content identification module and an interactive media types identifier module. The content identification module is configured to receive a fingerprint for a portion of the content of the first channel that was generated using an audio signal of the content and to identify the content and context of the content of the first channel. The interactive media types identifier module is configured to identify types of interactive media available for the content of the first channel based on the context of the content and a predefined input for accessing the types of interactive media. The identified types of interactive media are used to generate a graphical notification for rendering during presentation of the content of the first channel. The interactive media types identifier module is further configured to provide data to enable access to the types of interactive media via the graphical notification at any time during the rendering of the content from the first channel, in response to detecting the predefined input such that selection of one of the types of interactive media causes presentation of content for the selected one of the types of interactive media during rendering of the content of the first channel. The presented content has a contextual relationship to the content of the first channel. The types and content of interactive media available for the content changes over time as the content of the first channel changes based on progression of the television broadcast.

The embodiments of the invention thus provide a clear, concise and efficient way of presenting contextually related interactive media content for a television broadcast that can be accessed at any time during the presentation of the content of the broadcast television. The graphical notification is presented after the broadcast television content has been identified and after determining user engagement in the broadcast television content meets a predefined threshold. The graphical notification summarizes the different types of interactive media available and may, in some embodiments, identify only select ones of the available interactive media based on notification configuration defined for a user or desired by a user. In some embodiments, options may be provided to a user within the graphical notification to allow the user to access the remaining ones of the interactive media available for the content that are available but not presented to the user based on the user's notification configuration. In some embodiments, the graphical notification may be presented to the user for limited duration at the beginning of viewing of the content from the first channel and at predictable intervals. The periodic notification and access to the different types and content of the interactive media at any time during the rendering of the content of the first channel allows a user to review the interactive media at any time the user wishes and not be bound by the time defined by the content. The graphical notification user interface provides a simple, easy and efficient way of accessing specific types of the interactive media without having to sort through the various interactive media content.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Figure 1:
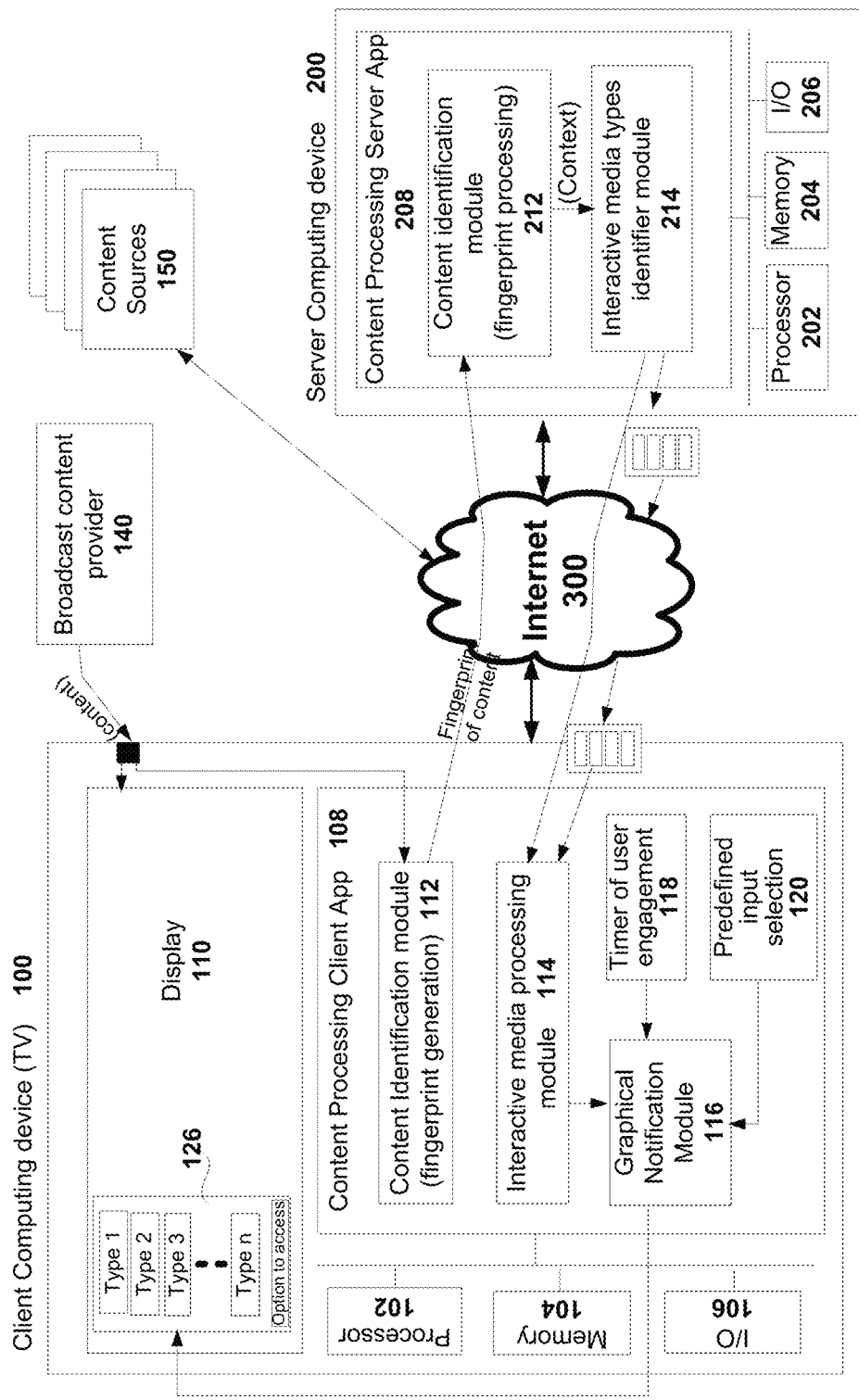
FIG. 1 illustrates a simplified overview of a system equipped with a content processing module for presenting interactivity options for a television broadcast, in one embodiment of the invention.

Broadly speaking, the embodiments of the present invention provide methods and systems to identify multimedia broadcast content streaming through a television and to provide interactive media that is available for the television broadcast content. A content processing module, executing on a processor of an Internet-enabled television or an Internet-enabled external device connected to the television detects navigation input identifying selection of a first channel that provides content for television broadcast, generates a fingerprint for a portion of the broadcast content using a fingerprint technology, using the generated fingerprint determines identity of the broadcast content, provides a graphical notification identifying different types of interactive media available during presentation of the content, and provides access to the interactive media during presentation of the graphical notification and at any time during presentation of the content of the first channel upon presenting a predefined input. The content processing module may periodically verify the identity of the content to ensure that the content of television broadcast has not switched after the content was initially identified. The content processing module may use a set of pre-computed fingerprints to determine the identity of the content and for performing periodic verification to ensure that the broadcast content continues to relate to the first channel and has not switched after the initial identification.

In some embodiments, the pre-computed fingerprints for a plurality of content may be maintained in a local memory, such as local cache memory, to allow the content processing module to retrieve the pre-computed fingerprints and find a match faster. If, during periodic verification or at any time during broadcast, a switch of content is detected, the module may, in response to the detection of the switch, generate new fingerprints for the switched content and match the new fingerprints with the corresponding pre-computed fingerprints stored in the local cache to determine the identity of the switched content. Once the switched content is identified, the graphical notification presented may be updated to identify the types of interactive media that are available for the switched content.

The various embodiments described herein provide a way of presenting interactive media offerings for a given broadcast content at a set point or points after detection of a user selection of the broadcast content. A predefined input allows access to the various types of interactive media offerings available for the broadcast content at any time during the presentation of the broadcast content. In some embodiments, the user may be provided with options to configure the conditions under which the available interactive media offerings are presented in a graphical notification so that the users can access the interactive media offerings at a time of their own choosing without any explicit prompting. Alternately, the user may be notified when a user preferred interactive media offering is available. For example, during a reality broadcast television (TV) show, such as a basketball game, there may be interactive media content related to the broadcast content, such as participant biographies, player and/or team statistics, media blogs, etc., as well as voting data that may be available for the broadcast content. Some users may want to have access to certain interactive media offerings while other users may just want to watch the broadcast content. The various embodiments provide ways to inform the users in a non-intrusive way the available interactive media offerings and allow easy access to the interactive media offerings at any time during the broadcast content.

The various embodiments would allow a client device, such as a television, to retrieve a list of interactive media offerings that have been registered or otherwise made available for the television broadcast, provide appropriate prompt assets for accessing the interactive media offerings, define the predefined input that is needed to access the interactive media offerings, and provide information about how to launch the interactive media offering should the user choose to engage in the interactive media offering by providing the required predefined input. The prompt asset may be in the form of a representative image, a link, or any other form of representing and presenting the various types of interactive media offerings. In some embodiments, a user's prompt configuration may be used to provide the appropriate prompts for the interactive media offerings. When the user selects the predefined input, the user is presented with a graphical notification with the prompt assets representing the different types of interactive media available for the content. User selection of a particular type of interactive media from the graphical notification would cause content data for the selected interactive media to render. The embodiments provide access to a range of interactive media experiences and such access is enabled by providing the predefined input. There is no need for prompting every time a particular type of interactive media is available for the television broadcast, which may result in over-prompting depending on the content, context of the content and the amount of interactive media available for the content. With the brief overview, various embodiments of the invention will now be described in detail with reference to the figures.

FIG. 1 illustrates a simplified overview of the system identifying high-level modules that are used to identify multimedia content selected for streaming to a television and provide available interactive media for the identified content. The system includes a client computing device 100, such as a television 100, to receive navigation input for a first channel, obtain content of the first channel from a broadcast content provider 140, and present the content data for the first channel as well as graphical notification of interactive media available for the content of the first channel. The system also includes a server computing device 200 that is communicatively connected to the client computing device 100 over a network, such as the Internet 300. In one embodiment, the television includes an Internet-connection interface (not shown) integrated into the television. In this embodiment, the television is directly connected to the Internet through the internet-connection interface and obtains broadcast content from different broadcast content providers 140. In another embodiment, the television (i.e., client device) is connected to an external device, such as a set-top box (not shown) with integrated Internet-enabled interface. The Internet-connected/enabled interface, for example, may include Internet protocol suite to receive television services over the Internet, instead of being delivered through traditional modes/formats, such as satellite signal or cable television formats. The television services may provide live television content, time-shifted television content and/or video-on-demand (VOD) content. Typically, in the Internet-enabled television, the content remains on a content source's network servers, such as the broadcast content provider's network servers, and the requested program content is streamed directly to the television, in response to the navigation input received at the client device 100. As a result, the server computing device (or simply "server") 200 connected to the client device 100 is unaware of the content source providing the requested content and the identity of the content selected for broadcast television.

In order to determine the identity of the content, the client device, in one embodiment, may be equipped with a hardware audio-capturing system (HACS) (not shown), for example, that is configured to extract a portion of the audio signal from the content selected from a content source's network server for streaming to the television, in response to a request provided in the form of a navigation input. HACS are one way of extracting a portion of the audio signal and other modules/systems/mechanisms may be used to extract the audio signal of the content. The extracted audio signal is forwarded to the content processing module 108, available at the client device 100 or at the set-top box to process the audio signal captured through the Internet-connection interface.

The modules within the client-side content processing module 108 are configured to select a portion of the audio signal and process the portion of the audio signal to generate an audio fingerprint. The generated audio fingerprint is used to determine the identity of the content. The identity of the content is, in turn, used to query the various content sources 150 to identify the types of interactive media available for the identified content. The types of interactive media available for the content are presented in a graphical notification and are accessed by a user by providing a predefined input at any time during the presentation of the content. Some exemplary modules within the client-side content processing module 108 include content identification module 112, interactive media processing module 114, and a graphical notification module 116, to name a few.

The server computing device 200 includes a server-side content processing module 208 that is used to process the generated fingerprint to identify the broadcast content, determine the context of the broadcast content and to identify types of interactive media available for the identified content. The server-side content processing module 208 includes a server-side content identification module 212 and an interactive media types identifier module 214, to name a few.

The content identification module 112 receives the audio signal for a portion of the content forwarded by the Internet-connection interface and processes the audio signal to generate an audio fingerprint for the content. A fingerprint generator within the content identification module 112 is used to process the audio signal by partitioning the audio signal into a plurality of segments of small intervals. For example, the portion of audio signal may be partitioned into segments of 5 second intervals. The fingerprint generator then selects a particular one of the segments for generating the audio fingerprint. In one embodiment, a particular segment of the audio signal may be selected based on the payload data of the content contained within. The fingerprint generator analyzes the particular audio segment to determine acoustic modulations contained within and generate a distinct vector of floating-point numbers for the audio segment. The floating point vector represents the audio fingerprint for the particular audio segment as it defines the modulation characteristic of the particular audio segment.

Once the audio fingerprint is generated, the client-side content identification module 112 forwards the audio fingerprint to the server-side content identification module 212. The content identification module 212 engages a fingerprint processor to process the audio fingerprint to identify the content. The fingerprint processor may compare the audio fingerprint (i.e., floating point vector) of the particular audio segment with pre-computed vectors of different portions of various contents to find a match. In some embodiments, the pre-computed vectors for different portions of various contents may be maintained in a local memory, such as a local cache, or a local storage device. When no match is found for the audio fingerprint within the local memory, the fingerprint processor may try to find a match of the audio fingerprint with pre-computed fingerprints of different portions of various contents maintained on a remote server. When a match is found, the fingerprint processor signals the content identification module the identity of the content and the content source that is providing the broadcast content. Alternately, the audio fingerprint may be matched against pre-computed vectors of portions of different content that are maintained in local memory and such matching may be verified periodically by matching with the vectors that are maintained on the remote server. In such embodiments, a subset of the vectors maintained on the remote server may be maintained in the local memory and refreshed periodically for faster matching. For more information related to generating audio fingerprint and matching the audio fingerprint using acoustic modulation, reference can be made to application Ser. No. 13/332,331, filed on Dec. 21, 2011, and entitled, "Audio Fingerprint for Content Identification," which is incorporated herein by reference. It should be noted that audio fingerprinting is one way of identifying content and that other techniques may be used for identifying the content. The fingerprint generator periodically generates audio fingerprints for the content of the first channel by sampling different portions of the audio signal and the generated audio fingerprints are used to verify the user's continued engagement with the content of the first channel.

For content that needs to be identified, fingerprint generation and verification against pre-computed fingerprints is one way of identifying the content when a user selects a channel for viewing. In some embodiments, the content identification may be more direct. In that, the content identification may be provided by the content provider (i.e., packaged or bundled) with the content of the selected channel, in response to the user selection of the channel. Alternately, the content may be retrieved from a content provider by a rendering device with an understanding of which content is being retrieved, based on information provided in a broadcast viewing guide or catalog. Irrespective of the way the content is identified, the content identification is used to query different content sources to determine the types of interactive media available for the content.

The server-side content identification module 212 may use the content identification information to determine the context of the broadcast content. The context and identity of the broadcast content is forwarded by the content identification module 212 to the interactive media types identifier module 214. The interactive media types identifier module 214 uses the identity and context of the content to query a plurality of content sources 150 to identify and retrieve the different types of interactive media available for the broadcast content. In some embodiments, the interactive media types identifier module 214 may retrieve the various interactive media from different content sources 150 and may categorize the interactive media by the content type. The interactive media types identifier module 214 then formats the interactive media content and forwards the formatted content to the interactive media processing module 114 on the client device 100.

In one embodiment, the content that is selected for analysis and matching is promotional or commercial media content, such as advertisements. When the content is live streaming content, it is easier to identify the live streaming content using one or more promotional media content that is scheduled for rendering at particular times during the streaming of the live broadcast content. As such, the audio fingerprint of the promotional media content may be used to identify the promotional media and the schedule of the promotional media content may be used to determine the content source and the identity of the multimedia content that is being selected for broadcast streaming. It should be noted that selection of promotional content to identify the broadcast content is exemplary and should not be considered restrictive. Other types of content that are selected for inclusion in the broadcast content may also be used to identify the broadcast content.

In one embodiment, the content processing module 208 may pre-populate the local cache/memory with pre-computed fingerprints of the different promotional media that are scheduled for rendering on different channels at a particular period of time and use the information in the local cache to find a match of the segment of audio signal and identify the broadcast content. The fingerprint processor may use the pre-computed vectors of different promotional media content maintained in the local cache to periodically verify that the particular television broadcast content that is being streamed continues to be selected. The fingerprint processor may periodically receive the fingerprints for the different portions of the broadcast content and verify the fingerprints with the pre-computed vectors of different promotional media content. During periodic verification, the fingerprint processor of the content identification module 212 may detect a switch in the broadcast content from a first channel to a second channel. The switch, for example, may be detected when the audio fingerprint of the promotional content associated with the broadcast content of the first channel does not match the pre-computed fingerprints of any promotional media content that is scheduled for rendering during the rendering of multimedia content of the first channel. Upon further verification, the fingerprint processor may determine that the audio fingerprint of the promotional content may instead relate to content from a second channel.

In some embodiments, the server 200 may dynamically collect promotional content related information scheduled for the different time periods in the background and refresh the information periodically to the local cache/memory to ensure that the promotional content is current for the current time period when the match is being performed and has not expired. The current content would ensure accurate matching so that the broadcast content may be identified in a fast, accurate and efficient manner. In some embodiments, the background updating may pre-load the fingerprint information for specific content based on the user's television viewing preference for different periods of time (for e.g., day, week, month, etc.), most frequently watched content, most popular content within the geo location of the user (using, for example, a zip code of the user, GPS location, etc.), etc., and use the updated information for identifying the broadcast content.

The interactive media types identifier module 214 uses the identity and context of the content to query a plurality of content sources 150 over the network 300 to identify and retrieve the different types of interactive media available for the broadcast content. In some embodiments, the interactive media types identifier module 214 may retrieve the various interactive media from different content sources 150, such as content source providing the content, celebrity content source, social media source, promotional media source, etc., and may categorize the interactive media by the content type. The interactive media types identifier module 214 then formats the interactive media content and forwards the formatted content to the interactive media processing module 114 on the client device 100.

The interactive media processing module 114 forwards the formatted content to the graphical notification module 116. The graphical notification module 116 uses the types of interactive media available for the content to generate a graphical notification for presenting on the display screen 110 of the client. The graphical notification 126 may be provided as a list with representative graphical images identifying the types of interactive media available for the content, as shown in the display screen 110 of FIG. 1. In addition to the types of interactive media, the graphical notification may also define a predefined input that is to be used to access the graphical notification. The different types of interactive media may include social media content generated by users/content providers, celebrity related content, promotional content, fantasy/virtual-world media content, and any other media content generated or provided by different content sources that are contextually related to the content. The generated graphical notification is presented to the user, so as to encourage the user to participate in the interaction and have a satisfying interactive multimedia content viewing experience.

In some embodiments, only a subset of the interactive media types available for the content are included in the graphical notification provided for active user selection. The subset of the types of interactive media selected for presenting in the graphical notification is based on the requesting user's preference as defined in a notification configuration. For example, if the notification configuration of the user prefers sports, celebrity, specific ones of the social media blogs/feeds, then the graphical notification presented to the user may include only those types of interactive media, even when there are additional types of interactive media available for the content. In some embodiments, options may be provided to access the other interactive media types that are available for the content but were not rendered in the graphical notification based on the user's notification preference. The option to access the interactive media types available for the broadcast content but were not presented in the graphical notification, for example, may identify a different pre-defined input than the one that is specified for accessing the graphical notification. In some embodiments, the notification configuration of a user may indicate that the user does not want to be provided with any notification regarding the availability of interactive media. In such embodiments, the generated graphical notification is not rendered to the user. In such embodiments, the user may be able to access the graphical notification and the various types of interactive media available for the broadcast content upon providing the one or more pre-defined input.

The notification configuration, in one embodiment, may be defined by a user using a configuration interface wherein the user may be presented with different types of interactive media as check-boxes, buttons, selection list, etc. User input selecting the different types of interactive media is used to determine the notification configuration of the user. In another embodiment, the graphical notification module 116 may keep track of the different types of interactive media the user generally interacts with when presented during rendition of different content and such interactions along with the context of the content may be used to define the notification configuration for the user. In some embodiments, based on the context of broadcast content, only select ones of the different types of interactive media may be available. As a result, the notification configuration for the user may take into consideration such variations in the available interactive media types when generating the graphical notification for the user for the selected broadcast content. For example, when the user is engaged in a sports channel, the graphical notification presented may include the various types of interactive media available for the sports channel. However, when the same user is engaged in a news channel, the graphical notification presented may be adjusted to include the types of interactive media available for the news channel, which may not include one or more of the types of interactive media available for the sports channel. For example, Fantasy Sports may be one of the types of interactive media available for the sports channel that would not be available for News channel. Thus, the contextual information and/or the user preferences may be used to filter the types of interactive media presented in the graphical notification for the user. Further, the graphical notification presented for user's active selection may include one or more options to access other types of interactive media that are available for the content.

In one embodiment, the graphical notification identifying the types of interactive media available for the broadcast content may be presented to the user after ensuring that the user has engaged with the broadcast content for at least a pre-defined period of time. This is to ensure that the graphical notification is not unnecessarily generated for content that the user is not engaged in for an extended period of time (for e.g., if the user is channel surfing). To avoid unnecessary generation and/or presentation of graphical notification, the graphical notification module 116 includes the logic to determine the amount of time of user engagement with content of a particular channel. When the user engagement with the content of a particular channel meets or exceeds a pre-defined threshold time, the graphical notification module 116 generates the graphical notification identifying the different types of interactive media available for the content in accordance to the notification configuration associated with the user. This feature enables the system to provide the graphical notification when it is relevant and to not waste unnecessary network and computation resources.

In some embodiments, the generated graphical notification 126 with available interactive media types is provided for rendering on a portion of a display screen for a limited duration, during presentation of the content from a selected channel. After the expiration of the time period, the graphical notification is designed to either fade away or cease to render. Rendering the graphical notification for a short period allows a user to have a satisfactory broadcast television viewing experience while providing access to the types of interactive media.

When the predefined input is detected at any time during the rendering of the content from the selected channel, the graphical notification module renders the graphical notification identifying the different types of interactive media available for the broadcast content. The predefined input, for example, may be a button press or a series of button presses on a remote control that is communicatively coupled to the television device (i.e., client device) or it could be any other input defined for an input device that is communicatively coupled to the television device.

During the rendering of the different types of interactive media, user selection of a specific one of the interactive media type would cause the data content from the specific one of the interactive media type to be rendered on a portion of the display screen of the television, in one embodiment. The content may be any form of multimedia content or may be a link to another website, such as a social media website, where the data content, in the form of social feed, that is contextually related to the broadcast content may be provided. The interactive media processing module 114, in one embodiment, detects the user selection at the specific interactive media type, identifies the content source 150, directly queries the content source over the network 300 and obtains data content for the specific interactive media type selected. The data content obtained from the content source is relevant for the broadcast content at the time of the request. In an alternate embodiment, the interactive media processing module 114 detects the user selection of the specific interactive media type from the graphical notification and sends a signal with the selection information to the interactive media types identifier module 214 on the server 200. The interactive media types identifier module 214, upon receipt of the request from the client device, will identify the content source 150 based on the identity and context of the content, query the identified content source 150 to obtain the data content for the selected interactive media type that is relevant to the broadcast content. The data content is forwarded to the interactive media processing module 114, which then provides the data content to the graphical notification module 116 for formatting and presenting on the display screen. The content sources 150 may include any one of media content source, promotional content source, social media content source, celebrity content source, etc.

Figure 2A:
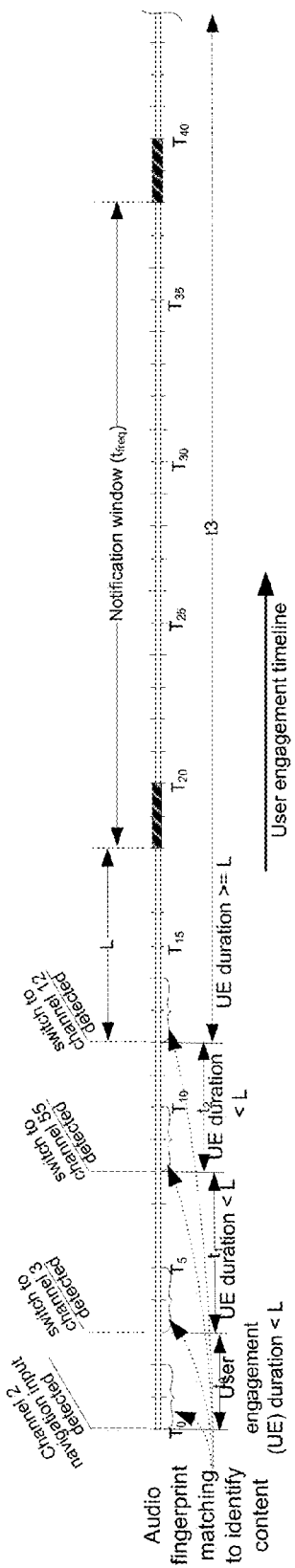
FIG. 2A illustrates an exemplary time line identifying when the graphical notification is presented to a user, in one embodiment of the invention.

FIG. 2A illustrates an exemplary time line identifying the surfing pattern of the user, wherein the user selects various channels of broadcast content, and the graphical notification provided for specific ones of the broadcast content based on the user engagement with the respective content. As indicated in the time line, the user selects broadcast content for channel 2 for viewing during time interval defined by 't0' (encompassing time T0-T3), then switches to channel 3 for viewing during time interval defined by 't1' (encompassing time T3-T8), then switches to channel 55 for viewing for time interval defined by 't2' (encompassing time T8-T12), and proceeds to channel 12 for viewing for time interval defined by 't3' (encompassing time T12 onwards), wherein each time slot on the time line is equal to a second, in this embodiment. The content processing module on the client device determines the time interval that the user spent at different channels and verifies to see if the user engagement at each of the channels meets or exceeds a predefined user engagement threshold (for e.g., 6 seconds). When the user engagement meets or exceeds the threshold, the content processing module uses fingerprint generated for the content to identify the content and the various interactive media types available for the broadcast content.

The various interactive media types available for the broadcast content is presented in a graphical notification during the presentation of the broadcast content. In this example, the content processing module may determine that the user engagement with broadcast content from channels 2, 3 and 5 do not meet or exceed the predefined user engagement threshold. However, it is determined that the user engagement with the content from channel 12 exceeds the predefined user engagement threshold. Consequently, the content processing module may generate the graphical notification for the broadcast content of channel 12 and present the same after the predefined user engagement threshold is met. The graphical notification is not generated for the broadcast content of channels 2, 3 and 5, respectively, as the user engagement with the content from each of these channels does not meet the predefined user engagement threshold. In addition to the initial notification (i.e., after the passage of user engagement threshold), the content processing module may, in some instances, present a second/subsequent graphical notification at a predefined notification frequency (otherwise termed as notification window or $t_{freq}$) as long as the user continues to be engaged with the content from channel 12. The content processing module may determine a time frame when the initial or previous graphical notification was presented. The content processing module may determine a next time frame when the graphical notification is to be presented. The next time frame is determined based on the predefined notification frequency. When the next time frame is reached and the user continues to be engaged with the broadcast content from the first channel, the graphical notification is presented for a limited duration. If a switch in the broadcast content is detected, the content processing module waits to see if the user's engagement with the switched content meets at least the predefined user engagement threshold. If the user's engagement meets or exceeds the predefined threshold for the switched content, the graphical notification is generated and presented for the switched content.

In some embodiments, the fingerprint matching to identify the broadcast content and types of interactive media available for the broadcast content may be determined before the predefined threshold for user engagement is met but the graphical notification for the broadcast content is rendered after the predefined threshold is met. In another embodiment, both the fingerprint matching and graphical notification may be performed after the predefined threshold is met to save computational resources.

Figure 2B:
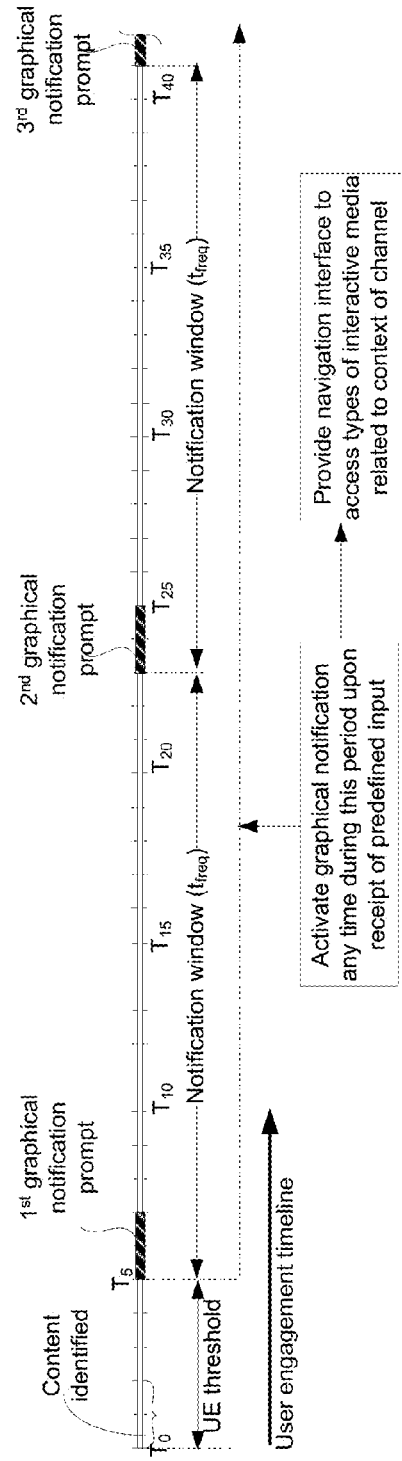
FIG. 2B illustrates an exemplary time line identifying a notification window used for informing users of a presence of the interactive media, in accordance to an embodiment of the invention.

FIG. 2B illustrates the time period when the graphical notification is rendered providing access to the types of interactive media available for the broadcast content from a selected channel. Identity of the content is determined as soon as the user selection of the first channel is detected and a graphical notification is generated for the content. When user engagement at the first channel exceeds the user engagement threshold, the graphical notification is presented for a limited duration, as shown in FIG. 2B. The graphical notification can also be accessed at any time during the rendering of the broadcast content, upon receipt of the predefined input. In some embodiments, the graphical notification is automatically rendered at the beginning of a notification window without requiring any user input. The notification window identifies a predefined threshold frequency (for e.g., 30 minutes) for rendering the graphical notification. User selection of particular type of interactive media causes the content data for the selected type of interactive media to be retrieved and rendered.

In some embodiments, the graphical notification may be rendered frequently to inform the user of the presence of the interactive media and the different types of interactive media that are available for the broadcast content. The graphical notification is presented in a clean and concise way summarizing the interactive media types available for the broadcast content and allowing access to any one of the interactive media types at any time during the rendering of the broadcast content. In one embodiment, the graphical notification may be presented at predefined threshold frequency only if the user does not interact with the initial presentation of the graphical notification. In such an embodiment, if the user has interacted with the graphical notification and viewed one or more interactive media types, the graphical notification module may not render the graphical notification at the predefined threshold frequency. This may be due to the fact that the user interaction indicates that the user is aware of the presence of the interactive media for the broadcast content, has engaged with the interactive media, knows how to access the interactive media for the broadcast content, and so does not need to be reminded of the presence of the interactive media content for the broadcast content. In another embodiment, irrespective of the presence or absence of the user interaction at the graphical notification, the graphical notification module may render the graphical notification for the broadcast content at the predefined threshold frequency. The graphical notification rendered at different times during the presentation of the broadcast content may be dynamically updated to reflect the types of the interactive media available for context of the broadcast content based on the progression of the television broadcast.

In this embodiment, if the user switched the channel to view a different broadcast content and then returns to the original broadcast content, the graphical notification may be presented for the broadcast content to remind the user of the presence of the interactive media, and such notification may be presented, in one embodiment, when the user's engagement with the original broadcast content after the return meets at least the predefined user engagement threshold period.

Figure 3A:
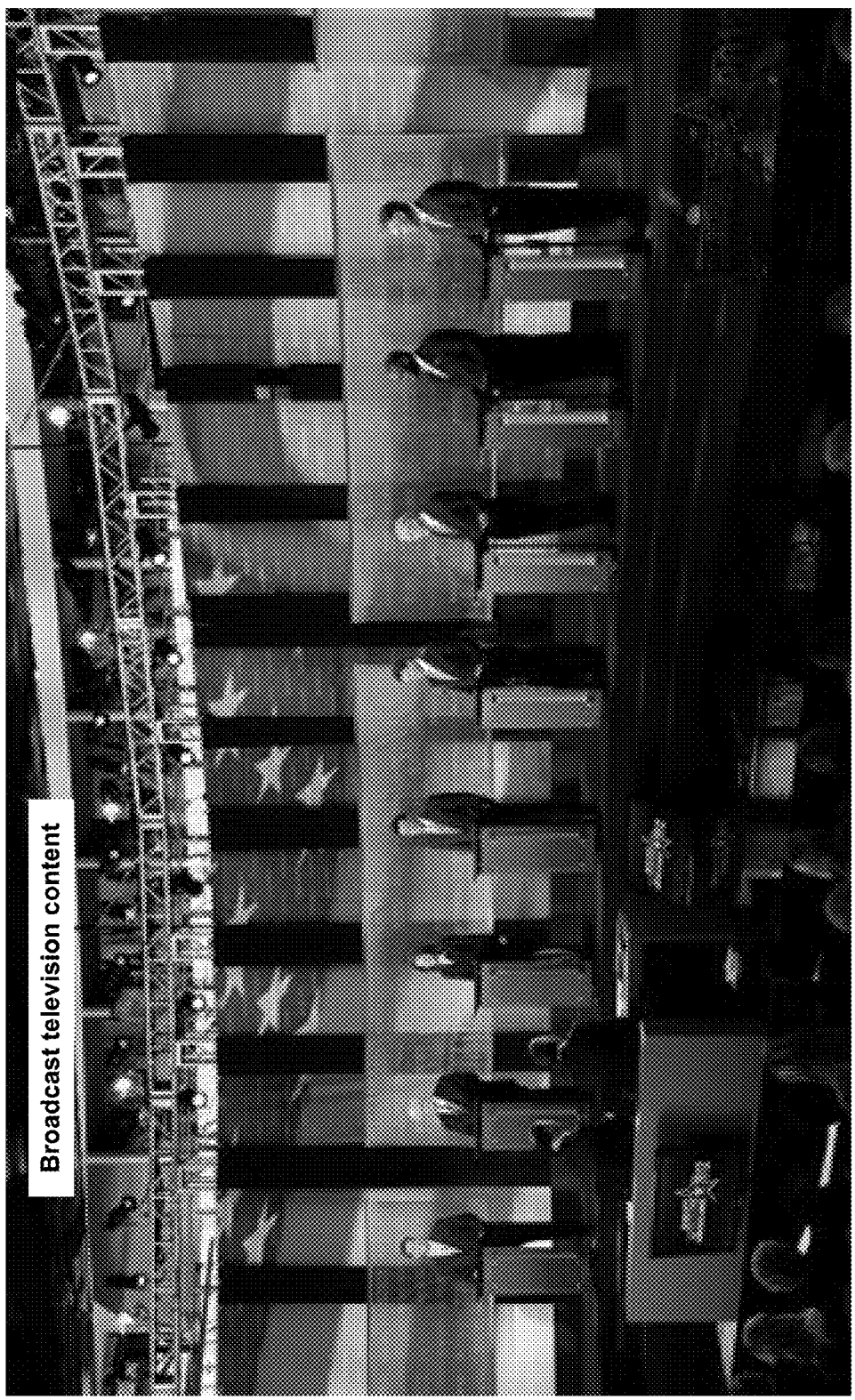
FIG. 3A illustrates an exemplary screen rendition of broadcast television content for which interactive media is identified and presented, in accordance to one embodiment of the invention.
Figure 3B:
FIG. 3B illustrates an exemplary screen rendition of a graphical notification provided for broadcast television content identifying available interactive media, in one embodiment of the invention.
Figure 3C:
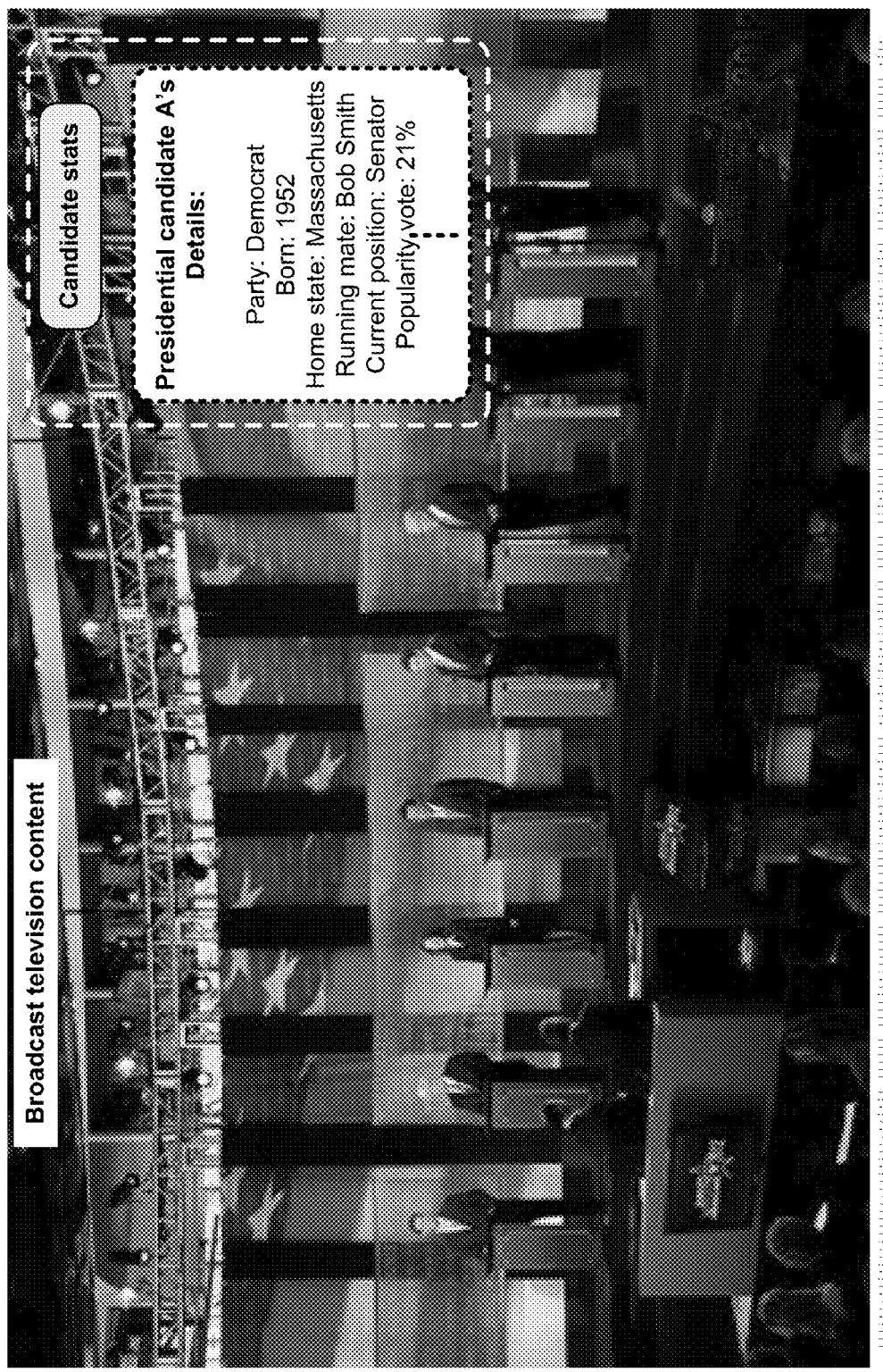
FIG. 3C illustrates an exemplary screen rendition of content data of a specific one of the interactive media selected from the graphical notification for the broadcast television content, in accordance to an embodiment of the invention.

FIGS. 3A-3C illustrate the timeline when the graphical notification is rendered for broadcast content and when the interactive media is available for selection, in one embodiment of the invention. As illustrated in FIG. 3A, the user engagement in the broadcast content, such as a presidential debate, has been detected by the content processing module and the content is identified using a fingerprint technology, such as an audio fingerprint technology. The content processing module determines user's engagement with the broadcast content in order to find out if the user engagement with the broadcast content meets or exceeds the predefined engagement threshold. The solid black portion on the timeline provided below the broadcast window in FIG. 3A identifies the amount of time of user engagement with the broadcast content as determined by the content processing module.

FIG. 3B illustrates the timeline when the user engagement at least meets the predefined engagement threshold (for e.g., 30 seconds). The engagement threshold is defined to be sufficiently long to allow proper content identification and/or verification to be performed and for identifying interactive media available for the identified content. The content identification and/or verification is to assure that the audio is not a common audio clip within the content asset, which may cause misidentification of the content. By defining a sufficiently long engagement threshold, identification of the selected content can be reliably verified by generating and matching additional fingerprints of the audio signal sample of the content. The graphical notification is generated and presented at the display screen of the client device where the broadcast content is being rendered. The graphical notification identifies the interactive media types that are available based on the context of the broadcast content. In some embodiments, the types of interactive media rendered in the graphical notification may depend on the notification configuration defined by/for the user. Thus, as shown in FIG. 3B, the context of the content is presidential debate and the different types of interactive media available for the user are related to the context of the broadcast content.

FIG. 3C illustrates the content from a particular type of interactive media that is rendered at the display screen, in response to the user selection of the particular type of interactive media from the graphical notification. The content data for the selected interactive media type is contextually related to the broadcast content and provides additional information for the broadcast content obtained from a content source. As the broadcast content changes over time, the interactive media content data also changes in accordance to the changes in the broadcast content. For instance, in the example presented in FIGS. 3A-3C, during the presidential debate, when a particular candidate is arguing and providing answer to a question from a moderator, the particular candidate's statistics may be rendered when the user selects the candidate stats interactive media type, as illustrated in FIG. 3C. Additionally, as the debate progresses and the particular candidate continues to respond or take a stand on a particular issue, the popularity vote data for that candidate may be updated to reflect the current voting statistic. In the case of sports broadcast content, changes in the outcome of the particular sport may cause more up-to-date interactive media content data to be rendered when a user selects a particular interactive media type for viewing. The types of interactive media may be selected based on the user's notification configuration or may be selected based on the popularity, reliability, quality, or any other broadcast content attribute.

Figure 4:
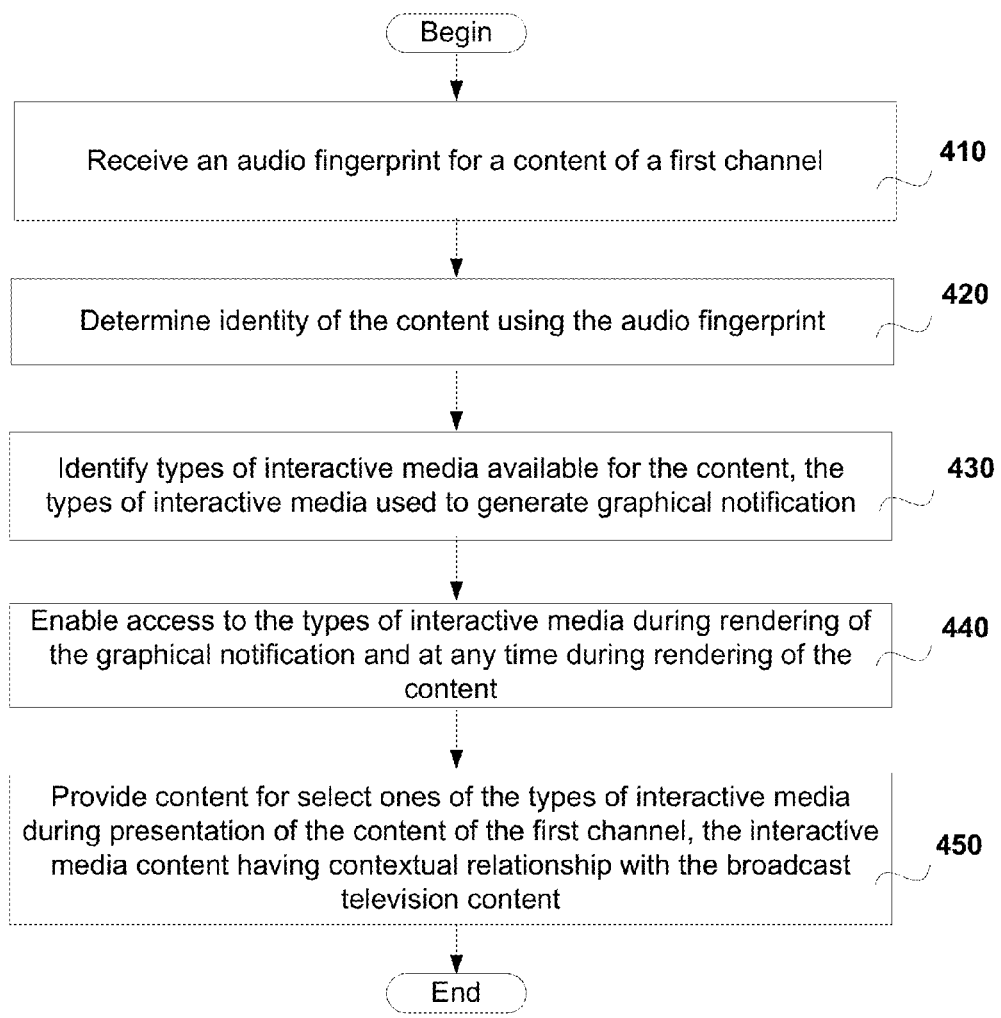
FIG. 4 illustrates a flow chart of process flow operations used for providing interactive media for broadcast television, in accordance to an embodiment of the invention.

With the detailed description of the various embodiments, a method for providing access to interactive media during rendering of broadcast content will now be discussed with reference to FIG. 4. The method begins at operation 410 when an audio fingerprint for a content of a first channel is received at a server computing device. The audio fingerprint may be generated at a client computing device using an audio signal of the content for the first channel rendering at a display screen of the client device. The generated fingerprint is forwarded to the server to determine the types of interactive media available for the content. The audio fingerprint is used to identify the content, as illustrated in operation 420. The identity of the content is determined by comparing the received audio fingerprint with pre-computed fingerprints associated with a plurality of content that is scheduled for the period of time when the content is being rendered. When a match is found, the information provided with the pre-computed fingerprints is used to identify the content, the content source, and the context of the content.

Using the identity of the content, the content processing module at the server computing device queries different content sources including the content source that provided the broadcast content to identify the interactive media available for the broadcast content, as illustrated in operation 430. The content processing module may request and retrieve the available interactive media, identify the type of interactive media and categorize the interactive media under the identified types. The identified types of interactive media are used to generate graphical notification. In some embodiments, the types of interactive media available for the broadcast content are forwarded to the client device for generating the graphical notification.

The content processing module at the server enables access to the identified types of interactive media available for the content during the time the graphical notification is rendered and at any time during the rendering of the broadcast content, as illustrated in operation 440. For example, the access may be provided as an interactive link that a user can select. When a user selects the interactive link at the client device, the interactive media content for the select one of the interactive media type is provided for rendering at the display screen of the client device, as illustrated in operation 450. For example, the user selection at the client device may cause a signal to be sent to the content processing module on the server. The signal may identify the type of interactive media selected at the graphical notification. In response to the signal, the content processing module may identify the content source, query and retrieve the interactive media content from the content source and provide the same to the corresponding content processing module executing on the client device. The content that is retrieved is contextually related to the broadcast content currently rendering on the client device. The content processing module of the client device formats the interactive media content and presents the interactive media content on the display screen of the client, in response to the user's selection of the interactive media type from the graphical notification.

Figure 5:
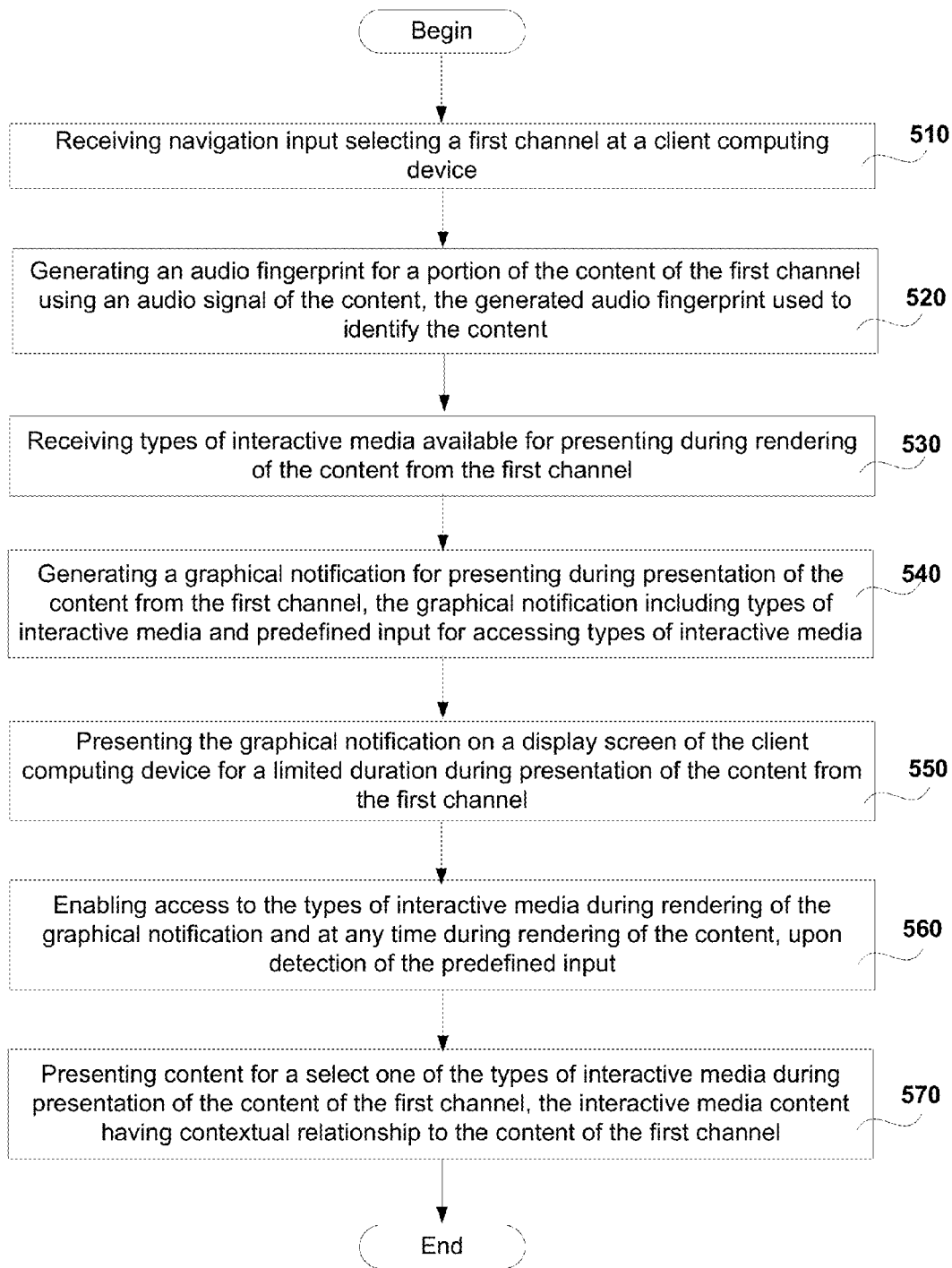
FIG. 5 illustrates a flow chart of process flow operations for providing interactive media for broadcast television, in accordance to an alternate embodiment of the invention.

FIG. 5 illustrates flowchart of operations for providing access to interactive media during rendering of broadcast content, in an alternate embodiment of the invention. The method begins at operation 510, when navigation input selecting a first channel is received at a client computing device. The navigation input may be provided using an input device, such as a remote control, a keyboard, a keypad, etc. In response to the selection of the first channel, an audio fingerprint is generated for a portion of the content of the first channel using an audio signal of the content, as illustrated in operation 520. The generated audio fingerprint is used to identify the content. In some embodiments, the audio fingerprint generated by the content processing client application module may be forwarded to the content processing server application module, where the fingerprint is processed. The content processing server application module may determine the identity of the broadcast content by matching the audio fingerprint with pre-computed audio fingerprints of a plurality of broadcast content that are scheduled for rendering on different channels at the time of rendering of the broadcast content for the first channel and maintained in a memory, such as a local cache memory of the server computing device. Alternately, the pre-computed audio fingerprints may be stored in a database that is accessible to the server computing device.

Once the identity of the broadcast content is determined, the server-side content processing module identifies the types of interactive media available for the broadcast content by querying a plurality of content sources using the identity of the content and obtaining the interactive media. The interactive media obtained from different content sources are categorized in accordance to the type and the identified types of interactive media are forwarded to the client-side content processing module.

The client-side content processing module receives the types of interactive media forwarded by the server-side content processing module and generates a graphical notification for presenting the identified types of interactive media, as illustrated in operation 540. The generated graphical notification includes the different types of interactive media and a predefined input for accessing the types of interactive media. In some embodiments, the graphical notification may identify a dedicated predefined input (i.e., buttons on a remote control, keys on a keypad, etc.) for accessing each type of interactive media. In such embodiments, the graphical notification may include a plurality of predefined inputs for accessing the different types of interactive media and such inputs may be provided alongside the interactive media for user selection/interaction. In other embodiments, certain types of interactive media may be accessed using dedicated predefined inputs while the remaining ones of the interactive media may be accessed using a single distinct predefined input. Consequently, based on the types of interactive media available for the broadcast content, one or more predefined inputs may be defined for accessing the interactive media types provided in the graphical notification. The generated graphical notification is presented on a display screen of the client computing device for a limited duration during presentation of the content from the first channel, as illustrated in operation 550. In some embodiments, the graphical notification is presented after it is determined that the length of the user's engagement with the broadcast content meets or exceeds a pre-determined threshold period. In some embodiments, the content processing module, when generating the graphical notification may include all the types of interactive media available for the broadcast content or may include only a subset of the types of interactive media available for the broadcast content. The subset of the types of interactive media presented in the graphical notification, in one embodiment, may be selected based on a notification configuration defined for or by the user. In an alternate embodiment, when no notification configuration is defined for or by the user, the types of interactive media selected for presenting in the graphical notification may be based on a user group in which the user is a member, the user demographics, based on popularity, based on reliability, based on quality, etc. or may be based on the types of interactive media that the user frequently interacts with either during presentation of contextually similar broadcast content or during presentation of any broadcast content. Further, the types of interactive media available for the broadcast content may change based on the change in the broadcast content due to the progression of the television broadcast. The changes in the broadcast content is detected using fingerprint of different portions of the audio signal related to the broadcast content and available types of interactive media are updated based on the progression of the television broadcast content so that at any given time the user is presented with the types of interactive media that are available for the current broadcast content.

The graphical notification enables the user to access to the types of interactive media presented within at any time during the presentation of the graphical notification and at any time during the presentation of the broadcast content, in response to the detection of the predefined input, as illustrated in operation 560. In some embodiments, the predefined input to access the graphical notification may be defined as a button, such as an "Ok" button, an "Info" button, etc., available on a remote control or any key/option available on an input device.

When a user selects a particular type of interactive media for viewing, the content for the selected type of interactive media is retrieved and rendered at the display screen of the client device, as illustrated in operation 570, during the rendering of the broadcast content of the first channel. In one embodiment, the content for the selected type of interactive media may be retrieved by the client-side content processing module directly from the corresponding content source or it may be provided by the server-side content processing module. The server-side content processing module receives the user selection of the type of interactive media from the client-side content processing module, queries and retrieves the content, and forwards the retrieved content to the client-side content processing module for rendering at the display screen of the client device during the rendering of the broadcast content. The interactive media content presented has contextual relationship to the content of the first channel currently rendering at the display screen. In some embodiments, the interactive media content is rendered for a pre-defined period of time and is designed to fade away or cease to render after the passage of the pre-defined amount of time. This is to make sure that the viewing portion of the display screen is not cluttered so as to allow the user to have an enriching viewing experience while providing access to the additional information related to the broadcast content at any time during the presentation of the broadcast content.

When a switch in the channel is detected from the first channel to a second channel based on a navigation input received at the client-side content processing module, the content processing module automatically generates a fingerprint for a portion of the broadcast content of the second channel using the audio signal, which is then used to determine the identity of the broadcast content. The content processing module further determines the amount of time of user engagement with the content of the second channel. When the user engagement with the content of the second channel meets or exceeds a pre-defined engagement threshold period of time, the client-side content processing module forwards the fingerprint to the server-side content processing module to determine the identity of the broadcast content of the second channel and to identify the types of interactive media available for the broadcast content. Periodic verification to ensure the user's continued engagement with the content of the first channel is enabled by generating fingerprints of different portions of the audio signal of the broadcast content and verifying against pre-computed fingerprints, in a manner described earlier.

The types of interactive media available for the broadcast content of the first or second channel may be obtained from different content sources including multimedia content source, social media content source, promotional media content source, celebrity related content sources, fantasy and/or virtual media content source, etc.

In some embodiments, when the user switches back to the broadcast content of the first channel, the graphical notification may be presented to the user when the notification frequency between the initial notification and the subsequent notification is met (i.e., if the time between the previous notification and the subsequent notification for the first channel was at least equal or greater than the notification frequency (for e.g., 30 minutes). So, the client-side content processing module not only detects the switching of the channel but also tracks the time frame between two notifications when presenting the graphical notification listing available types of interactive media for the broadcast content of a selected channel.

Select ones of the interactive media are presented during the presentation of the content from either the first channel or the second channel based on the current navigation of the user and based on amount of time of user engagement at the respective broadcast content meeting or exceeding the pre-defined threshold time. In one embodiment, the user may engage with the content of the first channel for a period of time that meets or exceeds the predefined threshold period and may switch to engage with the content of the second channel for the period of time that meets or exceeds the predefined threshold period. Consequently, the identity of the broadcast content of the first channel and the second channel are determined using a sample of the audio signal of the respective content. In this embodiment, after the identity of the content and verification of user engagement, when the user switches back and forth between the first channel and the second channel, the user may be able to access the graphical notification identifying the types of interactive media available for the content of the respective channels by providing the predefined input.

As mentioned earlier, the notification configuration may be explicitly defined by a user for different content by selecting the different types of interactive media from a user interface. In some other embodiments, the notification configuration may be derived based on the user's interactive behavior toward the various interactive media during previous presentation of the various broadcast content. In this embodiment, user access logs, session logs, etc., may be used to determine the user's preferences to the interactive media and such information may be used to auto configure the notification configuration of the user. In an alternate embodiment, the user interaction at the different types of interactive media presented for the first channel is used to dynamically refine/update an existing notification configuration or to generate a notification configuration for the user. For example, the notification configuration for the user may initially include all types of interactive media available for a broadcast content and over time, based on the user's interaction with the various types of interactive media, the notification configuration may be refined to only include the types of interactive media the user most commonly interacts with on a regular basis. Of course, the notification configuration so defined for the user may be further refined based on the context of the broadcast content. The notification configuration for each user may be associated with the user's identification attribute so as to present the appropriate interactive media types for the user during the future rendition of any broadcast content. The graphical notification identifying the list of interactive media is provided to the user in a non-intrusive way allowing the user to have a satisfactory content viewing experience.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for presenting interactivity options for a television broadcast, comprising:

receiving an audio fingerprint generated for a portion of content of a first channel selected for television broadcast, the audio fingerprint generated using an audio signal of the content;

determining identity of the content being presented on the first channel using the generated audio fingerprint;

identifying, based on the identity of the content, types of interactive media available for the content and a pre-defined input for accessing each of the types of interactive media, the identified types of interactive media used to generate a graphical notification for presenting during rendering of the content from the first channel;

providing selectable descriptive data to enable identification of the types of interactive media available for the content in the graphical notification, selection of one of the types of interactive media by interacting with a corresponding selectable descriptive data causes presentation of the content for the selected one of the types of interactive media during rendering of the content of the first channel, the content for the selected one of the types of interactive media having a contextual relationship to the content of the first channel, wherein the types and content of the interactive media change over time as the content of the first channel changes based on progression of the television broadcast, the change to the content determined using audio fingerprints of different portions of the audio signal related to the content of the television broadcast, the graphical notification dynamically updated to reflect the change to the types and content of interactive media available for content, the types and content of interactive media being relevant to a portion of the television broadcast currently rendering, wherein operations of the method are performed by one or more processors of a server computing device.

2. The method of claim 1, wherein determining identity of the content further includes, processing the received audio fingerprint for the portion of the content, the processing includes matching the audio fingerprint for the portion of the content to a specific one of a plurality of pre-computed audio fingerprints available for the content, wherein the pre-computed audio fingerprints are stored in a local memory and retrieved for comparing and matching.

3. The method of claim 1, wherein the change to the content is verified upon determining the user engagement with the broadcast content meets a pre-defined threshold of time.

4. The method of claim 2, wherein the identity of the content is verified after determining user engagement with the content of the first channel meets a pre-defined threshold of time, wherein the verification includes, receiving the audio fingerprint for a different portion of the content; and matching the audio fingerprint of the different portion to corresponding one of the plurality of pre-computed audio fingerprints.

5. The method of claim 4, wherein types of interactive media for the graphical notification are provided for rendering, after verification that the content presented for rendering is from the first channel.

6. The method of claim 1, wherein identifying types of interactive media further includes, querying one or more content sources to identify interactive media available for the content of the first channel; and categorizing the interactive media based on content type.

7. The method of claim 1, further includes, determining identity of a user selecting the content for broadcast television; and identifying a notification configuration associated with the user for viewing the types of interactive media, wherein the notification configuration determines which ones of the types of interactive media available for the content to include for generating the graphical notification for the content for presenting to the user.

8. The method of claim 1, further includes, receiving audio fingerprint for a different portion of content of television broadcast for verification of user engagement;

detecting a switch in the content from the first channel to a second channel during verification of user engagement; and identifying the types of interactive media available for the second channel, in response to detecting the switch, the identified types of interactive media are provided for updating the graphical notification to enable access to the types of interactive media available during presentation of the content from the second channel, wherein the types of interactive media available for the second channel being provided after determining user engagement with the second channel meets a pre-defined threshold of time.

9. The method of claim 1, further includes, receiving user interaction at the select ones of the types of interactive media presented for the first channel; and generating a graphical notification configuration for the user, the generated graphical notification configuration including the types of interactive media for which the user interaction is detected during rendering of the content of the first channel, the updated graphical notification configuration used in identifying the types of interactive media to be provided for presenting in the graphical notification during future rendition of content from any channel for the user.

10. A method for presenting interactivity options for a television broadcast, comprising:

receiving navigation input to a first channel that presents content of the television broadcast;

generating an audio fingerprint for a portion of content of the first channel using an audio signal of the content, the generated audio fingerprint used to determine identity of the content presented on the first channel;

generating a graphical notification for presenting during presentation of the content from the first channel, the graphical notification identifying types of interactive media available for the content based on the identity of the content, the generated graphical notification providing selectable descriptive data to enable identification of each one of the types of interactive media available for the content, wherein a predefined input is identified for accessing each one of the types of interactive media;

presenting the graphical notification on a portion of the display screen of the client computing device for a limited duration, while remaining portion of the display screen rendering the content from the first channel, the presenting is done after determining that the first channel remains selected for at least a pre-determined period of time;

enabling access to the types of interactive media during the rendering of the graphical notification and at any time during the rendering of the content from the first channel upon detection of the predefined input; and presenting content for a select one of the types of interactive media during presentation of the content of the first channel, the content for the select one of the types of interactive media having a contextual relationship to the content of the first channel, wherein the types and content of interactive media available for the content of the first channel changes over time as the content of the first channel changes based on progression of the television broadcast, the changes to the content of the first channel detected using audio fingerprints of different portions of the audio signal related to the content of the television broadcast, the graphical notification dynamically updated to reflect changes to the types and content of interactive media available for current content of the television broadcast, wherein method operations are performed by a processor of a client computing device.

11. The method of claim 10, further includes, presenting the graphical notification at periodic intervals during the presentation of the content from the first channel, the periodic intervals defined by a pre-defined notification frequency.

12. The method of claim 10, wherein the types of interactive media presented in the graphical notification is based on graphical notification configuration associated with a user providing the navigation input to select the first channel for television broadcast.

13. The method of claim 10, further includes verifying identity of the content for television broadcast after determining user engagement with the content from the first channel meets a pre-defined threshold of time, wherein the verification includes, generating an audio fingerprint for a different portion of the content, the generated audio fingerprint of the different portion used in verifying identity of the content presented for television broadcast.

14. The method of claim 13, wherein verifying identity further includes, automatically receiving types of interactive media available for content from a second channel when a switch in content from the first channel to the second channel is detected during verification; and dynamically updating the graphical notification presented on the display screen to include the types of interactive media available for the content from the second channel, wherein the dynamic updating of the graphical notification performed upon verification of the amount of time of user engagement with the content from the second channel meets the pre-defined threshold of time, wherein the content for the select ones of the types of interactive media presented in the updated graphical notification has contextual relationship to the content of the second channel and changes over time as the content of the second channel changes based on progression of the television broadcast.

15. The method of claim 10, wherein presenting content further includes, interacting with a content source associated with a select one of the types of interactive media directly over a communication network and obtaining the content for the select one of the types of interactive media.

16. The method of claim 10, wherein presenting the graphical notification further includes, determining a time frame when the graphical notification was presented during the presentation of the content for the first channel;

determining a next time frame when the graphical notification is to be presented, the next time frame determined based on a pre-defined notification frequency; and presenting, for the limited duration, the graphical notification with the types of interactive media available for the content when the next time frame is reached, the graphical notification being presented during the presentation of the content from the first channel.

17. A system for presenting interactivity options for a television broadcast, comprising:

content processing logic which when executed on a processor of a client computing device is configured to detect navigation input at the client computing device selecting a first channel that presents content of the television broadcast and provide the interactivity options for the content of the first channel, the content processing module having logic including, content identification logic that is configured to generate a fingerprint for a portion of the content of the first channel using an audio signal of the content, the generated fingerprint used to determine identity of the content of the first channel selected for television broadcast;

interactive media processing logic that is configured to receive types of interactive media available for the content of the first channel; and a graphical notification logic that is configured to generate a graphical notification for presenting the types of interactive media available for the content of the first channel, the generated graphical notification providing selectable descriptive data to enable identification of each one of the types of interactive media available for the content, wherein a predefined input is identified for accessing each one of the types of interactive media in the graphical notification, the generated graphical notification provided for presentation on a display screen of the client computing device for a limited duration during the presentation of the content of the first channel, wherein the interactive media processing logic is further configured to enable access to each one of the types of interactive media during the rendering of the graphical notification and at any time during the rendering of the content of the first channel, in response to detection of corresponding predefined input, and to dynamically retrieve content for a select one of the types of interactive media for presenting on the display screen during the presentation of the content of the first channel, the content retrieved for the select one of the types of interactive media having a contextual relationship to the content of the first channel, wherein the types and content of interactive media available for the content of the first channel changes over time as the content of the first channel changes based on progression of the television broadcast, the change to the content detected using fingerprint of different portions of the audio signal related to the content of the television broadcast, the graphical notification updated to reflect the change to the types of interactive media available for current content of the television broadcast.

18. The system of claim 17, wherein the graphical notification logic is configured to interact with a timer logic to determine if time of user engagement with the content of the first channel meets or exceeds a pre-defined threshold time defined in the timer logic in order to present the graphical notification at the display device.

19. The system of claim 17, wherein the graphical notification logic is configured to interact with a predefined input selection logic to determine if a predefined input was detected at the display device at any time during the presentation of the content of the first channel in order to present the graphical notification with the types of interactive media available for the content of the first channel.

20. The system of claim 17, wherein the interactive media processing logic within the content processing logic executing on the client computing device is further configured to interact with one or more content sources directly or over the Internet to obtain content for select ones of the types of interactive media for presenting on the display screen during rendering of the content of the first channel.

21. The system of claim 17, wherein the content processing logic further includes an audio fingerprint generator for generating an audio fingerprint for the portion of the content for the first channel selected for television broadcast.

22. A system for presenting interactivity options for a television broadcast, comprising:
content processing logic which when executed on a processor of a server computing device is configured to identify content selected for television broadcast and to provide the interactivity options for the content of the first channel, the content processing logic includes,
content identification logic that is configured to receive a fingerprint for a portion of the content of the first channel generated using an audio signal of the content and to identify the content of the content of the first channel;
interactive media types identifier logic that is configured to determine context of the content of the first channel and to identify types of interactive media available for the content of the first channel based on the context of the content of the first channel and a predefined input for accessing the types of interactive media, the identified types of interactive media used to generate a graphical notification for presenting on a display screen of a client device during rendering of the content of the first channel, the interactive media types identifier logic is further configured to provide selectable descriptive data to enable identification of the types of interactive media available in the graphical notification, selection of one of the types of interactive media by interacting with a corresponding selectable descriptive data causes presentation of content for the selected one of the types of interactive media during rendering of the content of the first channel,
wherein the content for the select one of the types of interactive media having a contextual relationship to the content of the first channel and wherein the types and content of the interactive media changes over time as the content of the first channel changes based on progression of the television broadcast, the change to the content detected by the content identification logic using fingerprint of different portions of the audio signal related to the broadcast content, the graphical notification dynamically updated to reflect the change to the types of interactive media available for current content of the television broadcast.

23. The system of claim 22, wherein the interactive media types identifier logic is further configured to provide periodic updates to the types of interactive media available for the content of the first channel based on changes detected during progression of the television broadcast, the periodic updates used to dynamically update the graphical notification generated for the content.

24. The system of claim 22, wherein the interactive media types identifier logic is further configured to query one or more content sources to identify interactive media available for the content of the first channel and for categorizing the interactive media based on content type.

25. The system of claim 22, wherein the interactive media types identifier logic is further configured to,
determine a notification configuration of a user selecting the content for television broadcast; and
provide select ones of the identified types of interactive media for generating the graphical notification for the user in accordance to the notification configuration of the user.

* * * * *